July 26, 1938.    R. A. SCHULTZ    2,124,753
ANTIFRICTION BEARING
Filed Sept. 26, 1936
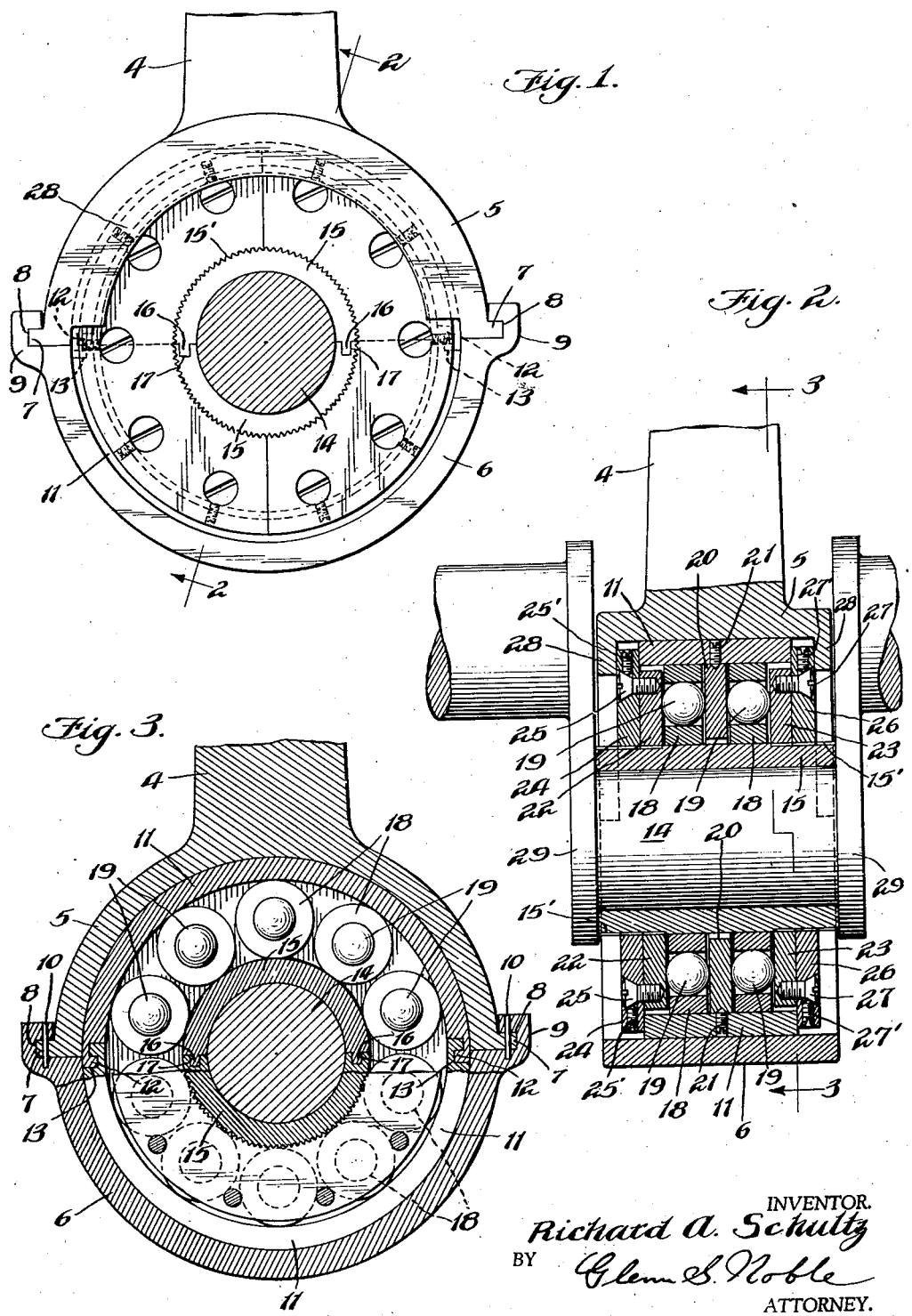
INVENTOR.
Richard A. Schultz
BY
Glenn S. Noble
ATTORNEY.

Patented July 26, 1938

2,124,753

UNITED STATES PATENT OFFICE 2,124,753

ANTIFRICTION BEARING

Richard A. Schultz, Chicago, Ill.

Application September 26, 1936, Serial No. 102,634

7 Claims. (Cl. 308—196)

This invention relates to bearings of the antifriction type which may be used for general purposes but which are intended particularly for the crank-engaging ends of crank rods. For bearings of this type it is desirable to have the sleeves, rings or other parts which surround the shaft split or made in two or more parts for convenience in assembling, and the present invention is designed to provide a particularly durable and efficient split bearing of this character. Engine crank shafts are subjected to vibration which becomes excessive in modern high speed engines which revolve at several thousand revolutions per minute. Such vibration is apt to loosen bolts or screws which have heretofore been utilized for fastening together the two halves of the connecting rod bearing or housing.

The objects of the present invention are to provide a split bearing adapted for connecting rods which is not apt to become loosened by an operation; to provide a split anti-friction bearing which may be readily assembled and which is substantially self-locking so that the parts are not apt to become separated; to provide a split bearing having the co-acting halves or sections provided with longitudinal tongues and grooves for fastening them together; to provide improved end thrust rings or means and to provide such other advantages and improvements as will appear more fully hereinafter. In the accompanying drawing I have shown a preferred form of my invention in which:

Figure 1 is an end view;

Figure 2 is a sectional view taken on the line 2—2 on Figure 1; and

Figure 3 is a sectional view taken on the line 3—3 of Figure 2.

As shown in the drawing the connecting rod 4 has a split housing or bearing for engagement with the crank shaft, comprising two halves 5 and 6. The edges of the part 5 are provided with longitudinal tongues or flanges 7 which engage with grooves 8 provided in longitudinal lugs or projections 9 along the adjacent edges of the complementary half or section 6. It will be understood that these parts are carefully machined or ground in order to make tight joints so that the parts will fit accurately and interlock to prevent any lateral or transverse movement between the sections. Ordinarily the joint may be completed before the interior periphery of the bearing is ground or finished so that a true cylinder will be provided. In some instances the two halves will be held together sufficiently by such interlocking or interengaging connections but pins or other fastening means 10 may be provided for engagement with the parts as shown in Figure 3 to prevent longitudinal movement.

The main bearing housing is provided with a split lining or cylindrical race member or sleeve 11, the complementary parts of which are provided with tongues 12 and grooves 13 which form interlocking joints as will be readily seen from Figure 3. The crank shaft 14 is also provided with a split sleeve or a race member 15, the complementary parts of which are also provided with interlocking tongues 16 and grooves 17 to fasten the parts together.

Any suitable antifriction devices may be interposed between the race members 11 and 15 but I prefer to utilize combined cylindrical rollers 18 and balls 19 which fit closely within the rollers and which extend slightly beyond the ends thereof to provide for end thrust. Figure 2 shows two sets of these rollers which are separated by a split ring 20 which fits closely within the sleeve 11 and which may be secured thereto by pins or screws 21 which will prevent turning of the same. The antifriction members are also engaged by split end rings 22 and 23 which preferably engage closely with the sleeve 15, preferably by means of teeth or splines 15'. The two halves of the ring 22 are fastened together by a split connecting and thrust ring 24, the ends of which are arranged in staggered relation with the ends of the ring 22 and these parts are held together by a plurality of screws or bolts 25 provided with locking screws 25' whereby the parts of the two rings are securely held together. The two halves of the split ring 23 are also secured together in a similar manner by a split thrust ring 26 and screws 27 and locking screws 27'. The outer edges of the rings 24 and 26 preferably extend beyond the ends of the sleeve 11 and fit freely within the outer housing as shown in Figure 2, one section of this housing being provided with annular inwardly projecting flanges 28, which make this section of the bearing of substantially channel shape cross section. The flanges 28 or ends of the main bearing section 5 preferably fit closely between the inner faces of the crank shaft arms 29 so that when the parts are assembled a particularly compact and substantial bearing is provided thereby.

The operation of my improved bearing will be readily understood by those familiar with the art, but attention may be called to the particular advantage of the fastening or coupling rings 24 and 26 which may be made of bronze or the like and if rigidly secured to the rings 22 and 23 respectively, will tend to prevent radial movement or to take up radial thrust as well as serving for taking up end thrust through the medium of the balls and coacting ring 28.

While I have shown a particular form of my invention, it will be apparent that the same may be modified for different types of cranks or for other uses and therefore I do not wish to limit my claims to the exact construction herein shown and described except as specified in the following claims.

I claim:

1. A bearing of the character set forth, comprising a plurality of series of rollers with balls mounted therein, a split raceway surrounding said rollers, the edges of said raceway having longitudinal interengaging fastening means comprising coacting tongue and groove members with radial and circumferential engaging portions whereby the raceway sections will be held against relative circumferential or radial movement, all surfaces of said tongue and groove members being parallel to the axis of the bearing, a central split separating thrust ring for separating the rollers and balls of the two series, means for securing the sections of said ring to the raceway, split end thrust rings at either end of the bearing engaging with the balls of the adjacent series, means for securing the sections of the end rings together and a split sleeve positioned within the series of rollers and engaged thereby, the edges of the sections of the sleeve having interengaging tongues and grooves serving to hold the sections against relative radial or circumferential movement.

2. A crank shaft bearing including a semi-cylindrical housing member having longitudinal marginal flanges along the edges thereof, a complementary semi-cylindrical housing member having grooves for engagement with said flanges, a split tubular race fitting in said housing, means for securing the parts of the race together, a shaft, a split tubular race engaging with said shaft, means for fastening the parts of the last named race together, radial and thrust anti-friction members rotatively mounted between said races, a pair of split end rings engaging with the inner race member, and means for connecting the sections of said rings comprising auxiliary split rings, means for securing the auxiliary split rings to the respective end rings, and flanges on the ends of the housing engaging with the outer faces of said auxiliary split rings.

3. A readily assembled anti-friction crank shaft bearing including semi-cylindrical housing members having longitudinal parallel interengaging tongues and grooves arranged to prevent radial and circumferential movement, a split tubular race in said housing having interengaging tongues and grooves arranged to prevent radial or circumferential movement, a shaft, a split tubular race engaging the shaft, radial and thrust anti-friction members rotatively mounted between said races, separable end thrust rings engaging with said anti-friction members, and annular projections on the housing engaging with said rings.

4. A readily assembled anti-friction bearing comprising a housing, a race member mounted in said housing, a shaft, a race member mounted on the shaft, combined thrust and radial anti-friction members operatively engaging said race members, end thrust rings secured to the inner race member and flanges on the ends of the housing to hold the end thrust rings against longitudinal movement.

5. A bearing comprising a semi-cylindrical housing member having longitudinal marginal flanges along the edges thereof, a complementary semi-cylindrical housing member having grooves for engagement with said flanges, a split tubular race fitting in said housing, means for securing the parts of the race together, a shaft, a split tubular race engaging with the shaft, means for fastening the parts of the last-named race together, anti-friction members rotatably mounted between said races, a pair of split end rings engaging with the inner race member, means for connecting the sections of each of said rings together, and flanges on the ends of the housing for holding the end rings and intermediate bearing members against longitudinal movement.

6. A bearing comprising a semi-cylindrical housing member having longitudinal flanges along the edges thereof, a complementary semi-cylindrical housing member having grooves for engagement with said flanges to hold said members together, a split tubular race fitting in said housing, means for securing the parts of the race together, a shaft, a split tubular race engaging with said shaft, means for fastening the parts of the last-named race together, anti-friction members rotatably mounted between said races, a pair of split end rings engaging with the inner race member, auxiliary split rings for fastening the sections of the end rings together, and means for securing the auxiliary split rings to the respective end rings.

7. A bearing including in combination, a semi-cylindrical housing member having longitudinal marginal flanges along the edges thereof, a semi-cylindrical housing member having grooves for engagement with said flanges to hold the parts together, a split tubular race fitting in said housing, a shaft, a split tubular race engaging with the shaft, radial and thrust anti-friction members rotatably mounted between said races, a pair of split end rings engaging with the inner race member, and means for connecting the sections of said rings comprising auxiliary split rings, and means for securing the auxiliary split rings to the respective end rings.

RICHARD A. SCHULTZ.